Patented July 16, 1946

2,404,293

UNITED STATES PATENT OFFICE 2,404,293

REGENERATION OF WASTE RUBBER

Alexander Johnston, Edinburgh 3, Scotland, assignor to The North British Rubber Company Limited, Edinburgh, Scotland No Drawing. Application November 12, 1942, Serial No. 465,400. In Great Britain January 30, 1942

5 Claims. (Cl. 260—720)

This invention relates to the regeneration or reclaiming of vulcanised waste rubber and/or vulcanised waste rubber containing fibrous material, so that it may be re-used for manufacturing goods or articles. The invention may include the rubber obtainable from used motor-car and other tyres, and other articles.

One object of the invention is to treat such waste rubber by heated inert flue or exhaust gases so that high pressure conditions are not required and such a gas being cheap and easily obtained.

A further object is to regenerate waste rubber so as to effect a considerable saving of time, power and expense.

A still further object of the invention is to conveniently separate all-rubber portions from other portions comprising rubber and fibrous material and so obtain different grades of rubber.

According to the invention to be now described the process for regenerating waste rubber comprises heating such waste rubber in and by contact with heated inert flue or exhaust gases until the rubber is in a condition in which it can be easily plasticised.

Furthermore when treating rubber which contains fibrous material, the temperature of the gases should be sufficiently high to bring about disintegration or carbonisation of the fibrous material within a relatively short time, and at the same time reduce the rubber to the required condition of plasticity.

The temperature of the gas or gases used may be within a range of 300° to 700° F., but it will be found that they are generally most effective within a range of 450° to 500° F.

The treatment is preferably carried out in such a manner as to control the temperature (by thermostat or otherwise) and/or the composition of the heating gases, by suitable dilution with other inert vapours or gases. When the heating stage has been completed, the mass of rubber is allowed to cool in an inert, or, relatively inert atmosphere, before being exposed to air.

Should the waste rubber comprise portions or layers which are substantially free from fibrous material such as canvas, whilst other portions or layers contain a substantial proportion of fibrous material, it may be desirable to separate the layers or portions before mastication and further processing, or even before the heating operation has been completed.

This separation may be readily effected as by stripping or pulling apart, and should it be desirable to expose the material to the further action of the gases such portion or portions may be subjected to a re-heating treatment. Thus in a rubber motor tyre, the tread and side wall portions may be separated from the carcase, and the different parts worked up separately, or if necessary returned for further heating in such separated condition.

If any of the portions thus treated be found to contain appreciable quantities of incompletely decomposed fibrous material, they may be readily removed by treatment in a washing mill or otherwise.

The waste rubber can be heated in a stream of the aforesaid gases at slightly increased pressure that is, at a pressure not substantially above atmospheric pressure, either in a tunnel plant or in an oven or vessel such as a digestor.

The invention may be carried into effect in various ways and five examples will now be given:

*Example 1*

The heating of fabric containing waste rubber such as motor tyres in a stream of boiler flue gases.

This process depends upon the utilisation of the hot gases in the boiler flue at some stage prior to their passage up the chimney, and the combined action of heat at 450° to 550° F. and relative inertness bring about the necessary reduction of the cotton to carbon, and the rubber to a soft plastic condition capable of being readily milled into a smooth sheet, and without danger of over-oxidation. The rubber of a tyre heated in this way becomes plasticised, and the fibrous material disintegrated without any appreciable consumption of power.

The waste rubber, cut into large segments may be packed into a suitable container, where the contents will be exposed to a stream of hot gases for about 2 hours, so that the heat penetrates uniformly to all parts of the packed material, the temperature being maintained constant at approximately 475° F. during this period. It is essential that the temperature of the gases does not become too high as this results in the excessive decomposition of the rubber and it is equally important that the temperature is not too low, otherwise the destruction of the fibrous material takes too long. Heat must be applied equally to all parts of the material being treated, as otherwise some portions are excessively reduced and are difficult to handle on the sheeting mill, while the fibrous material in other portions is insufficiently reduced or decomposed, so that the resultant sheet is not sufficiently smooth and takes too much refining. After heating for the required period, the container is withdrawn and the contents allowed to cool before being exposed to atmosphere, after which the products will be found to be in a suitable condition for milling and further processing to give a uniform smooth sheet.

Example 2

Scrap motor tyres in a similar condition are treated as in Example 1, except that during the heating process, steam is injected along with the flue gases for one minute periods every 15 minutes throughout the heating period. This injection of steam has the effect of assisting the separation of the carcase from the tread and the side walls, this operation being subsequently readily carried out by hand after the product has been removed from the container. The tread and side wall rubber is then milled and processed separately from the carcase rubber, and both kinds of rubber may, if desired, be washed on a washing mill to remove completely any residual partially decomposed fabric before further processing.

In this way two separate reclaim rubbers are obtained, one from the tread and side wall portions and one from the carcase portion. It may be stated that the steam, which is admitted intermittently, may be superheated, and that the use of seam induces a tendency for initiating the separation of the layers.

Example 3

Scrap motor tyres in a similar condition are treated as in Example 2, except that the heating process is interrupted after one to one and a quarter hours and the tread and side walls then separated from the carcase. Usually the tread and side wall portion is sufficiently heated after this period and may then be milled and processed without further heating. It is however usually necessary after this shorter period of heating to subject the carcase rubber to a further short period of heating.

Example 4

Scrap gas masks either in the form of complete face pieces or the spew from moulding are packed into the containers and heated for a period of one hour at 450° F. At the end of this period the product is cooled, removed from the container and is then found to be sufficiently plasticised to be milled and processed into a smooth sheet.

Example 5

Scrap motor tyres are cut into small sections and packed on trays which are placed in an oven, and through which oven flue gases at a temperature of from 475° to 500° F. are passed for a period of two hours. During this period steam injections of one minute duration each are made every 15 minutes. At the end of this period the product is cooled down by further steam injections and removed from the trays to be milled and processed to give a smooth sheet.

In any one of the above examples, it will be seen that the treatment period is not of long duration, and that as the cooling has been effected in an inert or relatively inert atmosphere, there is no risk of fire on exposure of the material to the air.

It is to be understood that the treatment according to the present invention does not involve any material consumption of power, and that the gases preferably used are readily obtainable inasmuch as they are waste gases, and that no high pressures are necessary.

I claim:

1. In the reclamation of rubber from vulcanized rubber waste containing fibrous carbonizable materials, the process which comprises heating pieces of such a rubber waste in an atmosphere of flue gases at a pressure not substantially exceeding atmospheric pressure and at a temperature varying from about 450° to 500° F. for a time varying from about 1 to 2 hours sufficient to carbonize the fibrous material while softening the rubber to the plastic stage and agitating the rubber pieces during the heating.

2. The process of claim 1 wherein the rubber pieces are agitated by tumbling them in a rotary foraminous container.

3. In the reclamation of rubber from vulcanized rubber tire waste containing tire fabric, the process which comprises heating pieces of such a rubber waste in an atmosphere of flue gases and steam at a pressure not substantially exceeding atmospheric pressure and at a temperature ranging from about 450° to 500° F. for a time period varying from about 1 to 2 hours sufficient to loosen the carcass portion from the tread and side wall portions, the steam being introduced for periods of about 1 minute between intervals of about 15 minutes during the heating, separating the carcass portion from the tread and side wall portions and separately processing the portions for recovery of the rubber contained therein.

4. The process of claim 3 wherein the separated carcass portion is subjected to a further heat treatment under the same conditions for a time sufficient to carbonize said fibrous material and to soften the rubber to the plastic stage.

5. The process of claim 3 wherein the separated portions are washed on a washing mill to remove residual partially decomposed fabric before further processing.

ALEXANDER JOHNSTON.